US 9,972,993 B2

(12) United States Patent
Burra et al.

(10) Patent No.: US 9,972,993 B2
(45) Date of Patent: May 15, 2018

(54) SYSTEM AND METHOD FOR CONTROLLING WIND POWER GENERATION SYSTEMS

(71) Applicant: GENERAL ELECTRIC COMPANY, Schenectady, NY (US)

(72) Inventors: Rajni Kant Burra, Bangalore (IN); Victor Robert Abate, Schenctady, NY (US); David Cole Magnuson, Greenville, SC (US); Keith Longtin, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 89 days.

(21) Appl. No.: 15/033,724

(22) PCT Filed: Oct. 31, 2013

(86) PCT No.: PCT/US2013/067747
§ 371 (c)(1),
(2) Date: May 2, 2016

(87) PCT Pub. No.: WO2015/065425
PCT Pub. Date: May 7, 2015

(65) Prior Publication Data
US 2016/0285252 A1    Sep. 29, 2016

(51) Int. Cl.
*F03D 9/00* (2016.01)
*H02H 7/06* (2006.01)
(Continued)

(52) U.S. Cl.
CPC ............ *H02H 7/067* (2013.01); *F03D 9/255* (2017.02); *H02J 3/38* (2013.01); *H02J 3/386* (2013.01);
(Continued)

(58) Field of Classification Search
CPC .. F03D 9/255; H02J 3/38; H02J 3/386; H02P 9/006; H02P 9/007; H02P 9/107; Y02E 10/726
(Continued)

(56) References Cited

U.S. PATENT DOCUMENTS 4,228,362 A * 10/1980 Jacobs .................... F03D 9/007
290/44
4,461,957 A    7/1984 Jallen
(Continued)

FOREIGN PATENT DOCUMENTS

EP    2067988 A2    6/2009
EP    2270331 A2    1/2011
(Continued)

OTHER PUBLICATIONS

Rasila., "Torque- and Speed Control of a Pitch Regulated Wind Turbine", Thesis for the Master of Science Degree, pp. 1-67, 2003.
(Continued)

*Primary Examiner* — Julio C. Gonzalez Ramirez
(74) *Attorney, Agent, or Firm* — Douglas D. Zhang; GE Global Patent Operation

(57) ABSTRACT

An electrical system for controlling a wind turbine is provided. The electrical system includes a first resistive element, a storage element and a controller. The first resistive element and the storage element are coupled to a DC link of the wind turbine. The controller is used for switching between the first resistive element and the storage element in response to a grid side fault condition to minimize mechanical loads induced by the grid side fault condition.

10 Claims, 5 Drawing Sheets

(51) Int. Cl.
*H02J 3/38* (2006.01)
*H02P 9/00* (2006.01)
*H02P 9/10* (2006.01)
*F03D 9/25* (2016.01)

(52) U.S. Cl.
CPC .............. *H02P 9/006* (2013.01); *H02P 9/007* (2013.01); *H02P 9/107* (2013.01); *Y02E 10/726* (2013.01); *Y02E 10/763* (2013.01)

(58) Field of Classification Search
USPC ...................... 290/44, 55; 700/286, 287, 388
See application file for complete search history.

(56) References Cited

U.S. PATENT DOCUMENTS

| | | | |
|---|---|---|---|
| 5,907,192 A | 5/1999 | Lyons et al. | |
| 7,095,129 B2 | 8/2006 | Moroz | |
| 7,102,247 B2* | 9/2006 | Feddersen | H02P 9/007 290/44 |
| 7,276,807 B2* | 10/2007 | Luetze | H02H 7/067 290/44 |
| 7,423,352 B2 | 9/2008 | Suryanarayanan et al. | |
| 7,518,256 B2* | 4/2009 | Juanarena Sarangueta | H02P 6/005 290/44 |
| 7,579,702 B2* | 8/2009 | Park | H02J 3/386 290/44 |
| 7,586,216 B2 | 9/2009 | Li et al. | |
| 7,719,128 B2 | 5/2010 | Kammer et al. | |
| 7,855,469 B2 | 12/2010 | Stegemann et al. | |
| 7,936,078 B2 | 5/2011 | Pavlak | |
| 7,950,901 B2 | 5/2011 | Barbu et al. | |
| 7,964,979 B2 | 6/2011 | Miranda et al. | |
| 8,043,048 B2 | 10/2011 | Daniels et al. | |
| 8,310,074 B2 | 11/2012 | Larsen et al. | |
| 8,804,383 B2* | 8/2014 | Zhan | H02M 1/36 323/901 |
| 8,994,202 B2* | 3/2015 | Gupta | F03D 9/003 290/44 |
| 2006/0244425 A1 | 11/2006 | Sihler | |
| 2007/0024227 A1 | 2/2007 | Kunkel et al. | |
| 2007/0052244 A1 | 3/2007 | Hudson | |
| 2007/0164567 A1 | 7/2007 | Luetze et al. | |
| 2008/0150282 A1* | 6/2008 | Rebsdorf | F03D 7/0284 290/44 |
| 2008/0179886 A1 | 7/2008 | Rebsdorf | |
| 2008/0203730 A1 | 8/2008 | Fahrenbach | |
| 2009/0047129 A1 | 2/2009 | Yoshida | |
| 2009/0174186 A1 | 7/2009 | Nyborg | |
| 2009/0184519 A1 | 7/2009 | Nies et al. | |
| 2010/0111693 A1 | 5/2010 | Wilson | |
| 2010/0117605 A1 | 5/2010 | Kretschmann | |
| 2010/0140940 A1 | 6/2010 | Kammer et al. | |
| 2011/0076142 A1 | 3/2011 | Veldkamp et al. | |
| 2011/0089693 A1 | 4/2011 | Nasiri | |
| 2011/0309620 A1 | 12/2011 | Fujin et al. | |
| 2012/0056429 A1 | 3/2012 | Hagedorn | |
| 2012/0063179 A1 | 3/2012 | Gong et al. | |
| 2012/0193918 A1 | 8/2012 | Mascarell et al. | |
| 2012/0217824 A1* | 8/2012 | Gupta | F03D 7/0272 307/145 |
| 2013/0200620 A1* | 8/2013 | Gupta | F03D 7/0284 290/44 |
| 2013/0334818 A1 | 12/2013 | Mashal et al. | |
| 2015/0145251 A1* | 5/2015 | Wagoner | F03D 7/0272 290/44 |
| 2015/0155809 A1* | 6/2015 | Gupta | F03D 7/0224 290/44 |
| 2015/0188443 A1 | 7/2015 | Takeda et al. | |
| 2016/0285399 A1* | 9/2016 | Wang | H02P 9/007 |

FOREIGN PATENT DOCUMENTS

| | | |
|---|---|---|
| EP | 2293431 A2 | 3/2011 |
| EP | 2375529 A1 | 10/2011 |
| WO | 2007132303 A1 | 11/2007 |
| WO | 2011035788 A2 | 3/2011 |
| WO | 2011035976 A1 | 3/2011 |
| WO | 2011076295 A2 | 6/2011 |
| WO | 2011107209 A2 | 9/2011 |
| WO | 2012000508 A2 | 1/2012 |

OTHER PUBLICATIONS

International Search Report and Written Opinion issued in connection with corresponding PCT Application No. PCT/US13/67747, dated Aug. 7, 2014.

Carballido, "Control of a Wind Turbine Equipped With a Variable Rotor Resistance", Department of Energy and Environment, Division of Electric Power Engineering, Chalmers University of Technology, Goteborg, Sweden, pp. 1-67, May 2009.

Dixit et al., "Towards Pitch-Scheduled Drive Train Damping in Variable-Speed, Horizontal-Axis Large Wind Turbines", 44th IEEE Conference on Decision and Control, and European Control Conference, Seville, Spain, pp. 1295-1300, Dec. 12-15, 2005.

Girsang et al., "Modeling and Control to Mitigate Resonant Load in Variable-Speed Wind Turbine Drivetrain", Journal of Emerging and Selected Topics in Power Electronics, pp. 28-70, 2013.

Feller et al., "Wind Turbine Control Strategy for Shaft Stress Reduction", IEEE International Conference on Industrial Technology, Cape Town, pp. 793-798, Feb. 25-28, 2013.

A Non-Final Rejection issued in connection with related U.S. Appl. No. 14/955,094 dated Feb. 16, 2017.

* cited by examiner

SYSTEM AND METHOD FOR CONTROLLING WIND POWER GENERATION SYSTEMS

BACKGROUND

Embodiments of the invention generally relate to a wind power generation system and, more particularly, to a system and method for controlling a wind power generation system.

Wind turbines are used to generate power by harnessing wind energy present in the environment. During operation, the wind turbines experience various undesirable loads which are mitigated using different approaches. Loads experienced by the wind turbines may include loads induced by the wind and loads induced by a fault condition on a grid connected to the wind turbines. The loads induced by the wind may be minimized by adjusting wind turbine components such as blade pitch control units and yaw motors. The loads induced by the fault condition on the grid may be mitigated by design parameters such as size and fabrication material as well as operating parameters such as pitch angles of wind turbine blades.

During a fault condition on the grid, an electromagnetic torque in the wind turbine may increase suddenly and may be followed by an over speeding event of a rotor of the wind turbine due to loss of power at an output. In such circumstances, the over speeding event and the sudden increase in the electromagnetic torque induce mechanical loads in the wind turbine. The wind turbine includes a pitch control unit that is configured to control a pitch angle of the wind turbine blades. The pitch control unit changes the pitch angle of the wind turbine blades to reduce the mechanical loads. However, if a rate of change of pitch angle is greater than a predefined rate of change of pitch angle, the wind turbine components may experience severe oscillations. The tower of a wind turbine is particularly susceptible to oscillations, and tower oscillations reduce life of the wind turbine and increase maintenance costs.

Wind turbine components such as towers, drivetrains, and gearboxes are typically designed to withstand aforementioned mechanical loads that are induced due to potential fault conditions on the grid. For example, gearboxes are designed to withstand a peak electromagnetic torque up to three times of a nominal operating torque. Such designs lead to larger gearboxes and increased costs.

Hence, there is a need for an improved system to address the aforementioned issues.

BRIEF DESCRIPTION

Briefly, in accordance with one embodiment, an electrical system for controlling a wind turbine is provided. The electrical system includes a first resistive element, a storage element and a controller. The first resistive element and the storage element are coupled to a DC link of the wind turbine. The controller is used for switching between the first resistive element and the storage element in response to a grid side fault condition to minimize mechanical loads induced by the grid side fault condition.

In another embodiment, a wind turbine is provided. The wind turbine includes a tower, a nacelle disposed on the tower, a rotor, wind turbine blades coupled to the rotor and an electrical system. The electrical system includes a first resistive element, a storage element and a controller. The first resistive element and the storage element are coupled to a DC link of the wind turbine. The controller is used for switching between the first resistive element and the storage element in response to a grid side fault condition to minimize mechanical loads induced by the grid side fault condition.

In yet another embodiment, a method for controlling a wind turbine is provided. The method includes steps of detecting a grid side fault condition, estimating a peak electromagnetic torque, computing a rate of change of rotor speed, controlling the estimated peak electromagnetic torque in the wind turbine using a first resistive element, a second resistive element, a storage element or a combination thereof and minimizing mechanical loads in the wind turbine by controlling wind turbine components based on the computed rate of change of rotor speed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit," "circuitry," "controller," and "processor" may include either a single component or a plurality of components, which are either active and/or passive and are connected or otherwise coupled together to provide the described function.

Embodiments of the present invention include a system and method for controlling a wind turbine. The wind turbine includes a tower, a nacelle disposed on the tower, a rotor, wind turbine blades coupled to the rotor and an electrical system. The electrical system includes a first resistive element, a storage element and a controller. The first resistive element and the storage element are coupled to a DC link of the wind turbine. The controller is used for switching between the first resistive element and the storage element in response to a grid side fault condition to minimize mechanical loads induced by the grid side fault condition.

Figure 1:
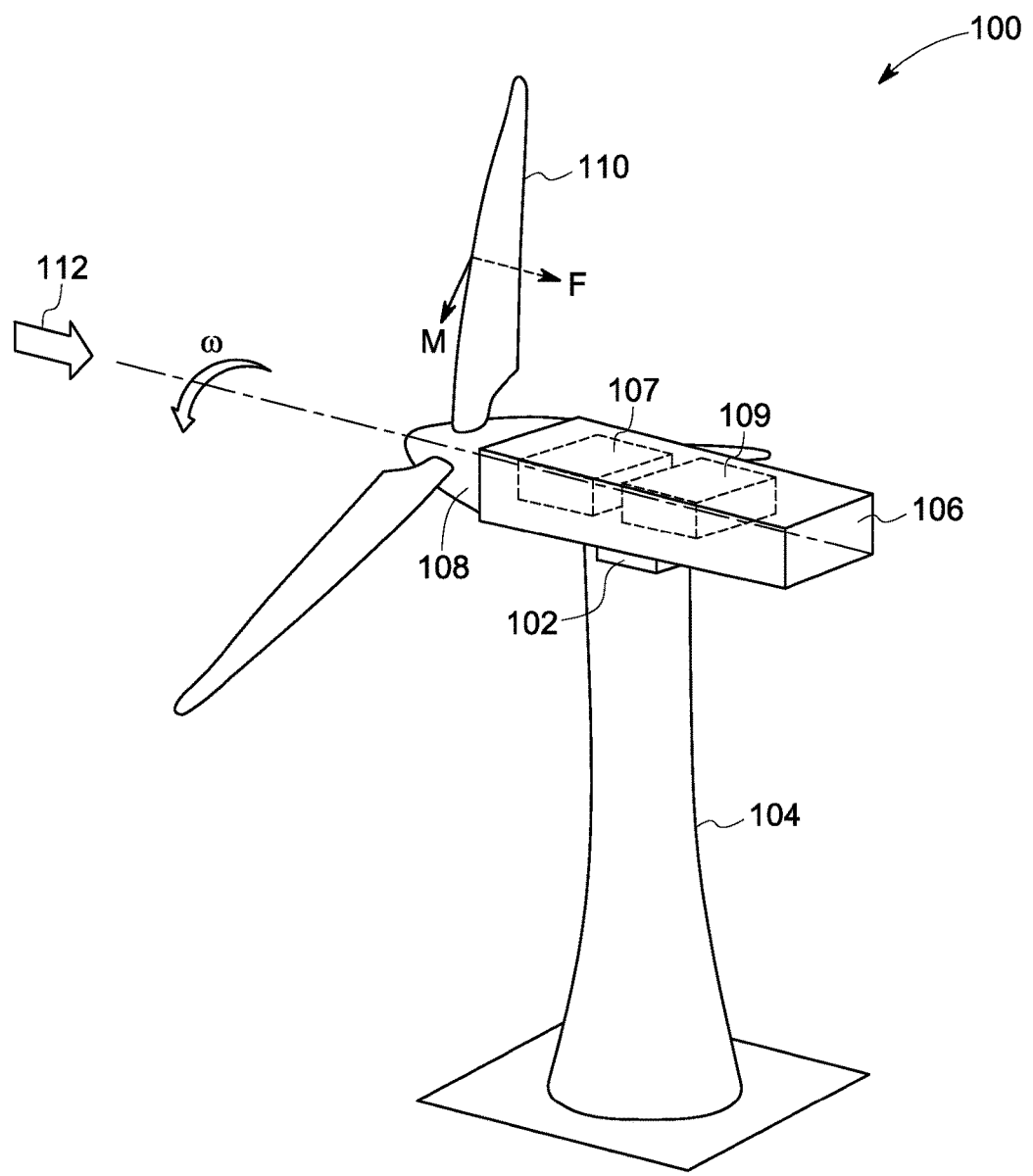
FIG. 1 is a schematic representation of a wind turbine including an electrical system in accordance with an embodiment of the invention.

FIG. 1 is a schematic representation of a wind turbine 100 including an electrical system 102 in accordance with an embodiment of the invention. The wind turbine 100 includes a tower 104, a nacelle 106 disposed on the tower 104, a rotor 108 and wind turbine blades 110 coupled to the rotor 108. The wind turbine blades 110 are rotated by wind moving in a direction represented by reference numeral 112. The wind turbine 100 also includes wind turbine components that are used to operate the wind turbine, for example, a drive train 107 and a blade pitch control unit 109. During a manufacturing process of the wind turbines 100, each of the wind turbine components is designed to withstand predetermined loads. For example, the gearbox of the wind turbine is designed to withstand a peak electromagnetic torque up to three times of a nominal operating torque. Such design requirements of the wind turbine components lead to greater cost of manufacturing at lower power ratings. Therefore, the wind turbine 100 includes the electrical system 102 to reduce costs and increase power ratings by increasing the peak electromagnetic torque withstanding capabilities of the wind turbine.

Figure 2:
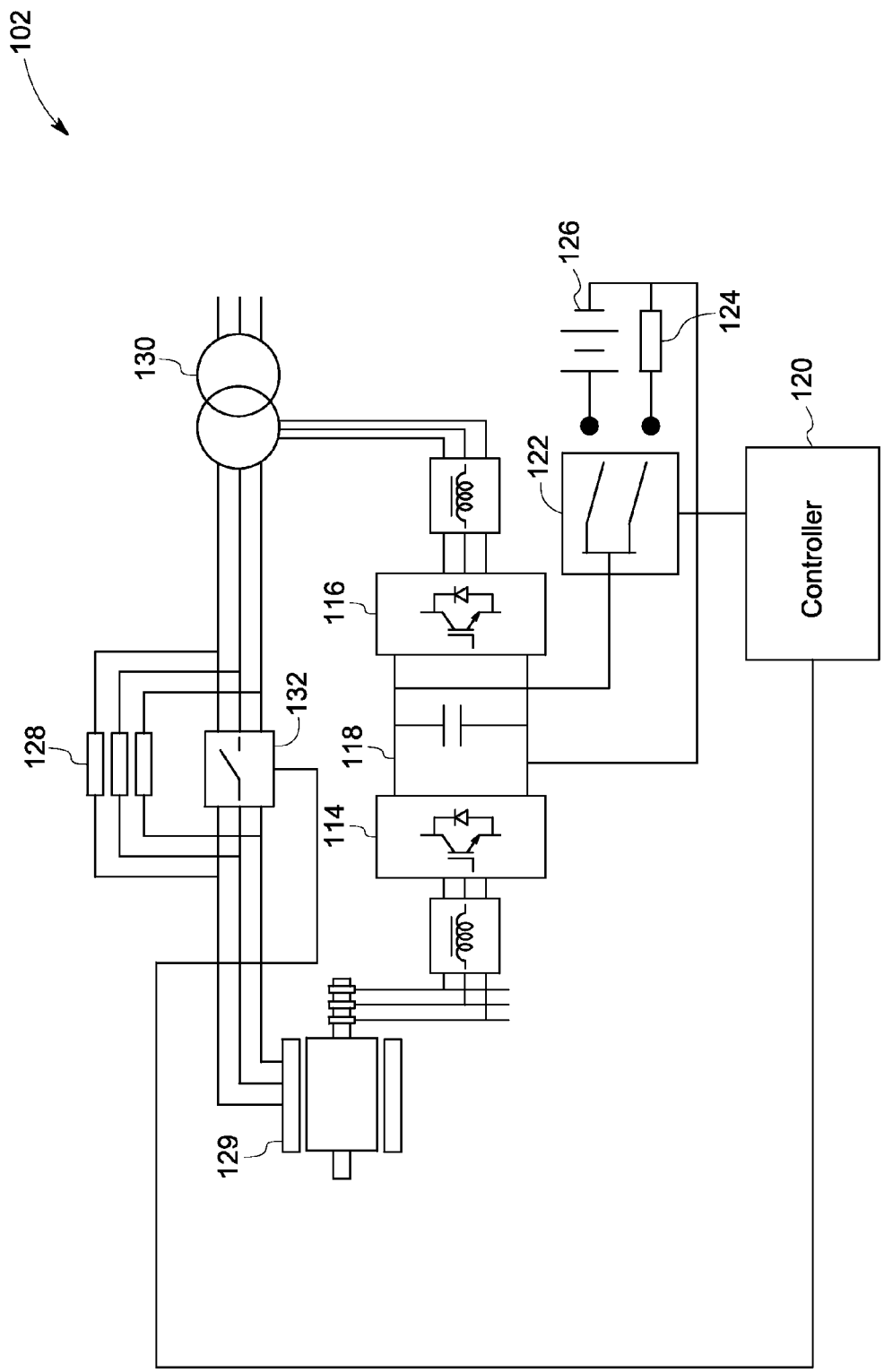
FIG. 2 is a schematic representation of an electrical system in accordance with an embodiment of the invention.

FIG. 2 is a schematic representation of an electrical system 102 in accordance with an embodiment of the invention. The electrical system 102 includes a rotor side converter 114 and a line side converter 116 that are coupled to each other via a DC link 118. The electrical system 102 also includes a controller 120 that receives operating parameters of the wind turbine (FIG. 1) from a plurality of sensors (not shown). In one embodiment, the plurality of sensors may include a wind speed sensor, a rotor speed sensor, a grid voltage sensor and a grid frequency sensor. In event of a grid side fault, the controller 120 identifies the grid side fault in real time at time (t)=1 and monitors rotor speed information received from the rotor speed sensor. Once the grid side fault occurs, grid voltage on a grid side drops rapidly to a near zero value. The near zero value of the grid voltage (Vgrid≈0) induces a sudden decrease in power output of the wind turbine. The sudden decrease in power output of the wind turbine results in increasing rotor speeds. The controller 120 computes a rate of change of rotor speed due to the sudden decrease in power output. The controller 120 further estimates a peak electromagnetic torque in the wind turbine. In one embodiment, the controller estimates the peak electromagnetic torque based on a magnetizing current, a rotor current, a line converter voltage, and/or turbine terminal voltage.

The controller 120 in the embodiment of FIG. 2 is communicatively coupled to a first resistive element 124, a second resistive element 128 and a storage element 126 that form a part of the electrical system 102. In one embodiment, the first resistive element 124 and the second resistive element 128 may include a resistor. In another embodiment, the first resistive element 124 and the second resistive element 128 may include any power dumping device. The first resistive element 124 may be chosen such that the first resistive element 124 can absorb current of the peak electromagnetic torque for one to three seconds. In a more specific embodiment, the storage element 126 includes a battery.

The controller 120 compares a predefined threshold value of a peak electromagnetic torque with the estimated peak electromagnetic torque. If the estimated peak electromagnetic torque is greater than the predefined threshold value of the peak electromagnetic torque, the controller 120 generates control commands to control the estimated peak electromagnetic torque. The first resistive element 124 and the storage element 126 are used to control the estimated peak electromagnetic torque in the rotor 108 (FIG. 1) of the wind turbine, and the second resistive element 128 is used to control the estimated peak electromagnetic torque in a stator 129 of the wind turbine. The controller 120 triggers a first switch 122 to couple at least one of the first resistive element 124 and the storage element 126 to the DC link 118 to control the estimated peak electromagnetic torque. The controller 120 triggers the first switch 122 to couple either one or both of the first resistive element 124 and the storage element 126 based on a value of the estimated peak electromagnetic torque. The first resistive element 124 absorbs the current in the wind turbine and allows the controller 120 to control a real time electromagnetic torque prevailing in the wind turbine. In situations where the storage element 126 is also coupled to the DC link 118, the storage element 126 provides a counter torque by providing active power in the wind turbine and helps in reducing the estimated peak electromagnetic torque.

The controller 120 may further trigger the second switch 132 to couple the second resistive element 128 between the stator 129 and a point of common coupling 130 in the wind turbine (FIG. 1). The second resistive element 128 is coupled in series to windings of the stator 129 via the second switch 132. The second resistive element 128 also absorbs the current in the stator 129 to reduce the estimated peak electromagnetic torque.

In addition to controlling the estimated peak electromagnetic torque, the first switch 122 and the storage element 126 control steady state oscillations induced during the normal operations of the wind turbine. During normal operations, the second switch 132 stays closed and the second resistive element 128 is bypassed. The controller 120 detects the steady state oscillations in the wind turbine and minimizes the steady state oscillations using the first resistive element 124 and/or the storage element 126. In one embodiment, the steady state oscillations include sub-synchronous modes, voltage disturbances, and frequency disturbances. The controller 120 includes at least some predefined resonance modes and determines the steady state oscillations based on the predefined resonance modes. The controller 120 upon determination of the steady state oscillation triggers the first switch 122 to couple either one or both of the first resistive element 124 and the storage element 126 to control the steady state oscillations and hence enables continuous operation of the wind turbine without stopping the wind turbine.

The controller 120 further minimizes mechanical loads in the wind turbine. A rate of change of a pitch angle by the blade pitch control unit 109 is at least dependent on the estimated peak electromagnetic torque in the wind turbine. The controller 120 generates commands for the blade pitch control unit 109 to change the pitch angle in response to the estimated peak electromagnetic torque. Therefore, if the estimated peak electromagnetic torque is above the predefined threshold value of the electromagnetic torque, the rate of change of pitch angle also increases beyond a threshold value. Such an increase in the rate of change of the pitch angle may induce mechanical loads in the wind turbine components which are above the withstanding capabilities of the wind turbine. Thus, the controller 120 controls the estimated peak electromagnetic torque which consequently controls the rate of change of pitch angle and the mechanical loads. In one embodiment, the mechanical loads include oscillations in the tower of the wind turbine.

In one embodiment, in order for the controller 120 to discriminate between a grid side fault and a wind gust, the controller 120 monitors the rate of change of the rotor speeds and compares the rate of change of rotor speed with a predefined rate of change of rotor speed. Computing the rate of change of rotor speed based on the rotor speed allows early detection of the wind gust, at least half to one second earlier for example, and provides the blade pitch control unit 109 with more time to respond, thereby reducing mechanical loads. In one embodiment, the predefined rate of change of the rotor speed may be defined during designing of the controller 120 and may vary based on size, mass and inertia of the wind turbine. The controller 120 may further classify between a grid loss event and a wind gust based on grid monitoring sensor data. In the event of a wind gust that is not accompanied by a grid side fault, the controller 120 abstains from switching the first switch 122. In this embodiment, the blade pitch control unit 109 receives the wind gust information from wind speed sensors (not shown) and acts based on the received wind gust information.

Figure 3:
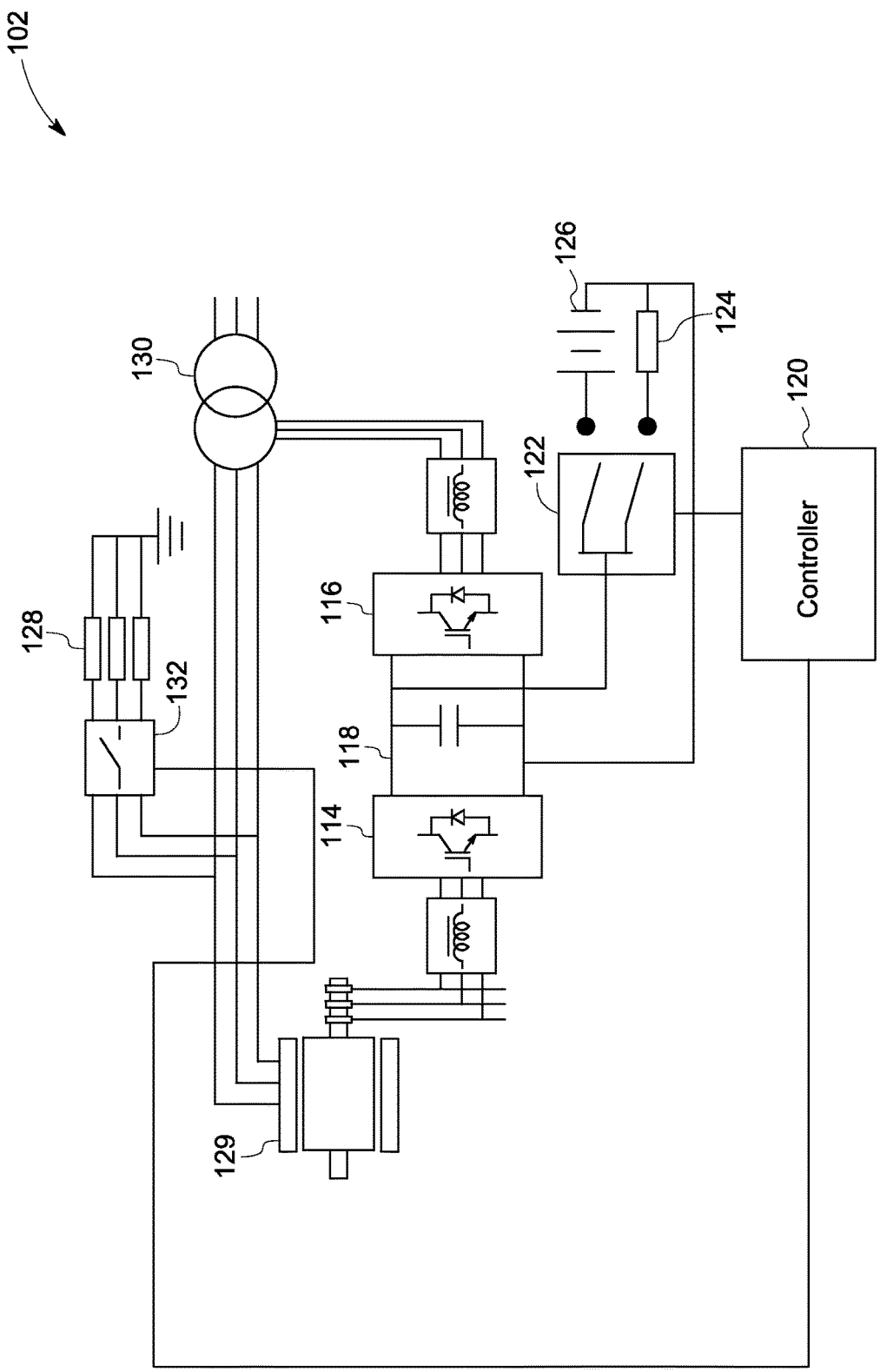
FIG. 3 is a schematic representation of an alternative embodiment of an electrical system in accordance with an embodiment of the invention.

FIG. 3 is a schematic representation of an alternative embodiment of an electrical system 202 including the second switch 132 and the second resistive element 128 coupled in parallel to the windings of the stator 129 in accordance with an embodiment of the invention.

Figure 4:
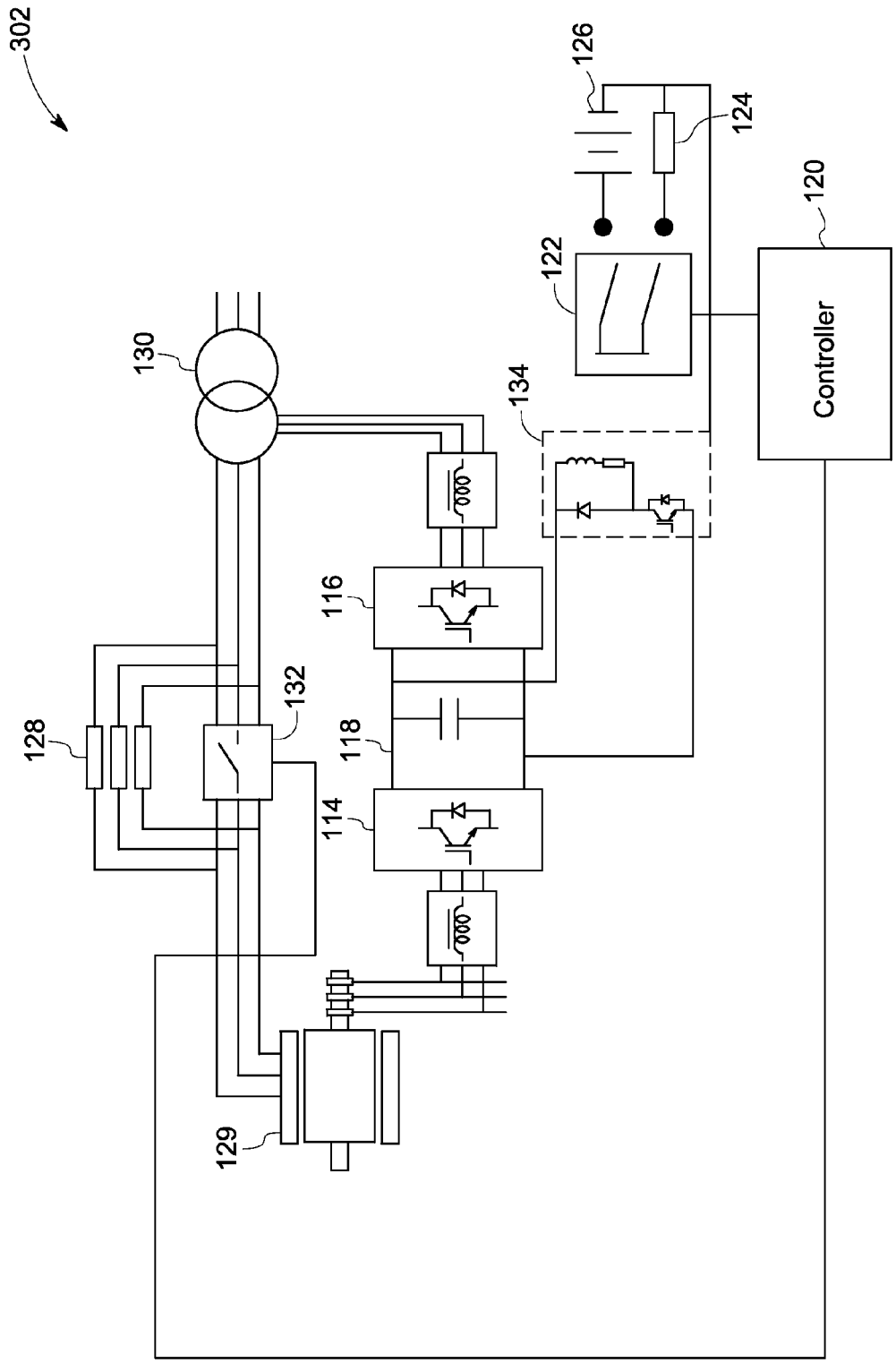
FIG. 4 is a schematic representation of yet another alternative embodiment of the electrical system in accordance with an embodiment of the invention.

FIG. 4 is a schematic representation of an alternative embodiment of an electrical system 302 including a DC chopper 134 in accordance with an embodiment of the invention. The DC chopper 134 is coupled to the DC link 118. The first resistive element 124 and the storage element 126 are coupled to the DC chopper 134. The DC chopper 134 is further coupled to the controller 120. The controller 120 controls the DC chopper 134 to switch between the first resistive element 124 and the storage element 126.

Figure 5:
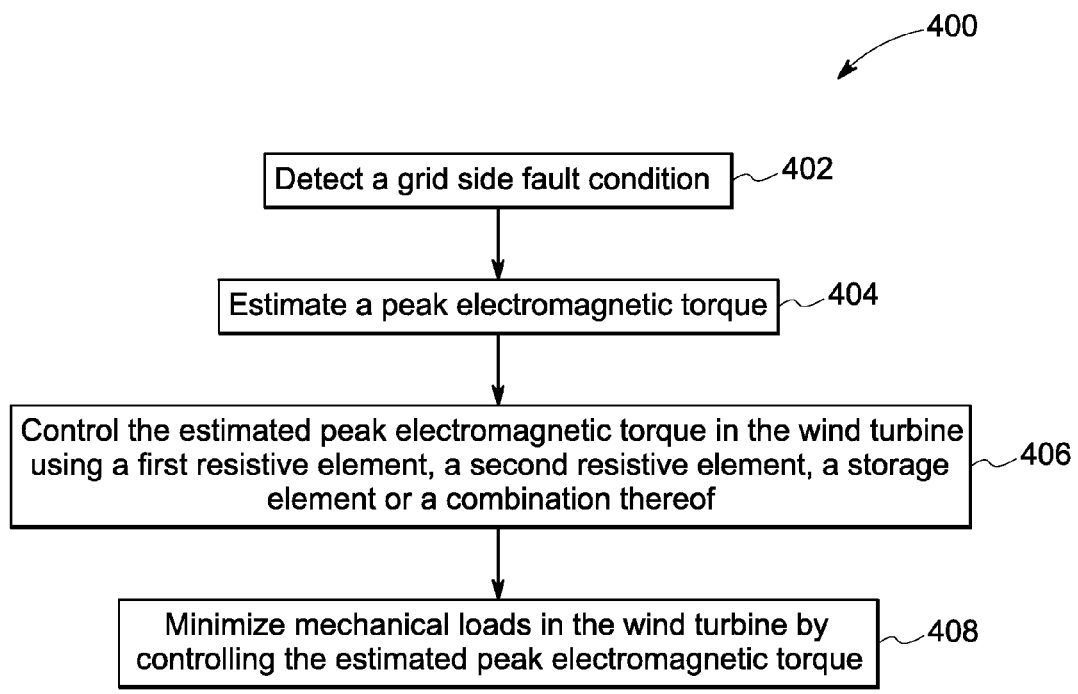
FIG. 5 is a flow chart representing steps involved in a method for controlling a wind turbine in accordance with an embodiment of the invention.

FIG. 5 is a flow chart representing steps involved in a method 400 for controlling a wind turbine in accordance with an embodiment of the invention. The method includes detecting a grid side fault condition in step 402. In one embodiment, the grid side fault condition is determined by obtaining a rotor speed and determining a rate of change of rotor speed. The rate of change of rotor speed is compared with a predetermined threshold value of the rate of change of rotor speed. Furthermore, based on the comparison, a classification is performed between the grid side fault condition and a wind gust event. In step 404, a peak electromagnetic torque of the wind turbine is estimated and the estimated peak electromagnetic torque is controlled using a first resistive element, a second resistive element, a storage element or a combination thereof in step 406. Furthermore, mechanical loads in the wind turbine are minimized by controlling the estimated peak electromagnetic torque in step 408. In one embodiment, wind turbine components are controlled to control the estimated peak electromagnetic torque. In another embodiment, minimizing the mechanical loads comprises minimizing tower oscillations by controlling a drivetrain, a rotor and a blade pitch control unit. In yet another embodiment, the method also includes selecting a second resistive element for minimizing the peak electromagnetic torque in a stator.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrical system for controlling a wind turbine comprising a rotor and a stator, comprising:
    a rotor side converter;
    a line side converter;
    a DC link coupling the rotor side converter and the line side converter;
    a first resistive element and a storage element coupled by a first switch to the DC link;
    second resistive elements which are connected in parallel with a second switch and are coupled between windings of the stator and a point of common coupling with an output of the line side converter; and
    a controller configured for:
        estimating a peak electromagnetic torque in the wind turbine;
        when the estimated peak electromagnetic torque is not greater than a threshold value, setting the second switch so as to bypass the second resistive elements and couple windings of the stator to the point of common coupling, and setting the first switch for using at least one of the first resistive element or the storage element for controlling steady state oscillations of the wind turbine; and
        when the estimated peak electromagnetic torque is greater than the threshold value, setting at least one of the following actions: setting the second switch so as to enable the second resistive elements to absorb electromagnetic torque from the stator, or setting the first switch for using at least one of the first resistive element or the storage element for absorbing electromagnetic torque from the rotor.

2. The electrical system of claim 1, further comprising a DC chopper coupled to the first resistive element, the storage element, and the DC link.

3. The electrical system of claim 1, wherein the first resistive element comprises a resistor and the storage element comprises a battery.

4. A wind turbine comprising the electrical system recited in claim 1.

5. The wind turbine of claim 4, further comprising a DC chopper coupled to the first resistive element, the storage element and the DC link.

6. The wind turbine of claim 4, wherein the first resistive element comprises a resistor and the storage element comprises a battery.

7. A method for controlling a wind turbine comprising a rotor, a stator, a rotor side converter, a line side converter, a DC link coupling the rotor side converter and the line side converter, a first resistive element and a storage element coupled by a first switch to the DC link, and second resistive elements which are connected in parallel with a second switch and are coupled between windings of the stator and a point of common coupling with an output of the line side converter, the method comprising:
    estimating a peak electromagnetic torque in the wind turbine;

when the estimated peak electromagnetic torque is not greater than a threshold value, setting the second switch so as to bypass the second resistive elements and couple windings of the stator to the point of common coupling, and setting the first switch for using at least one of the first resistive element or the storage element for controlling steady state oscillations of the wind turbine; and when the estimated peak electromagnetic torque is greater than the threshold value, setting at least one of the following actions: setting the second switch so as to enable the second resistive elements to absorb electromagnetic torque from the stator, or setting the first switch for using at least one of the first resistive element or the storage element for absorbing electromagnetic torque from the rotor.

8. The method of claim 7, further comprising, prior to estimating the peak electromagnetic torque, detecting a grid side fault condition.

9. The method of claim 8, wherein detecting the grid side fault condition comprises obtaining a rotor speed and computing a rate of change of rotor speed.

10. The method of claim 9, further comprising comparing the rate of change of rotor speed with a predetermined threshold and classifying between the grid side fault condition and a wind gust event based on the comparison.

* * * * *